Jan. 1, 1952    A. LOVE ET AL    2,580,934
APPARATUS FOR MEASURING EXTENSION OF FERRO-MAGNETIC
MATERIAL DURING ROLLING
Filed Aug. 15, 1949    3 Sheets-Sheet 1

INVENTORS
Angus Love + György Sik
By Watson, Cole, Grindle + Watson

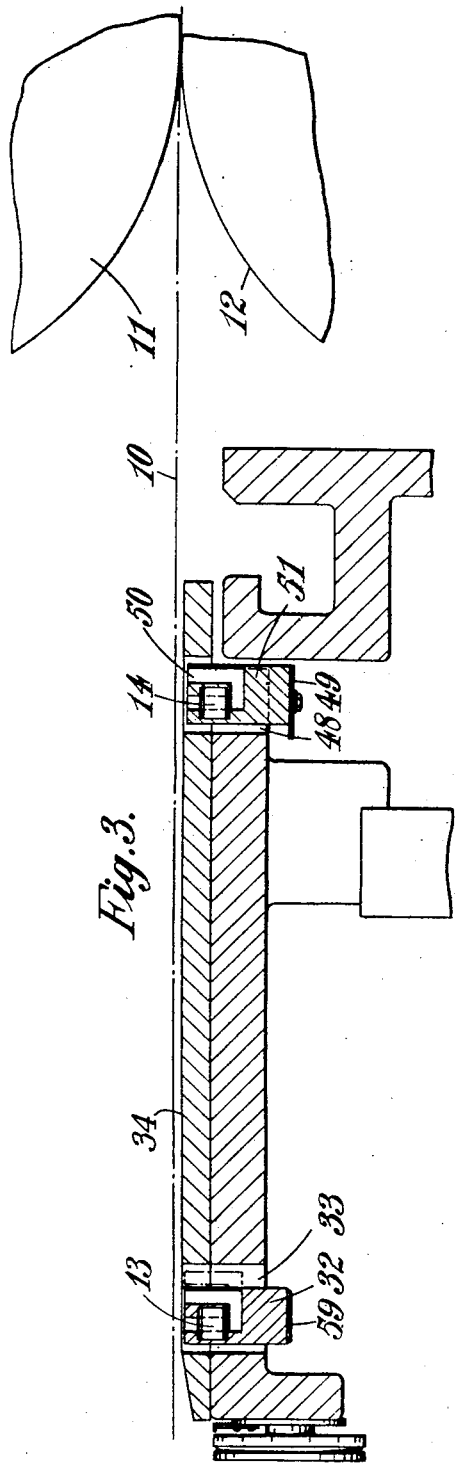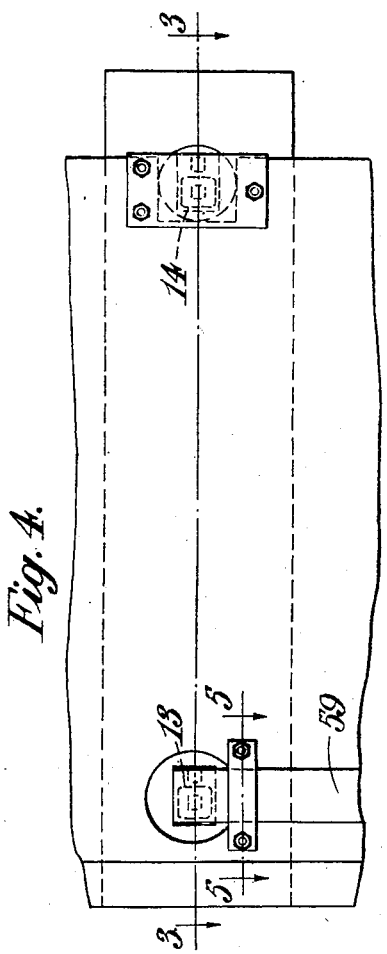

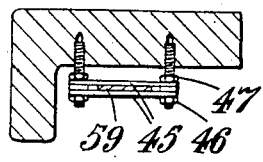
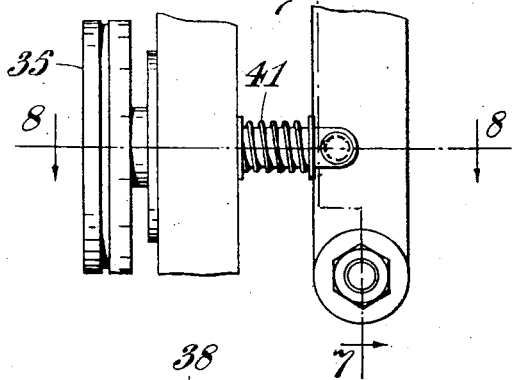
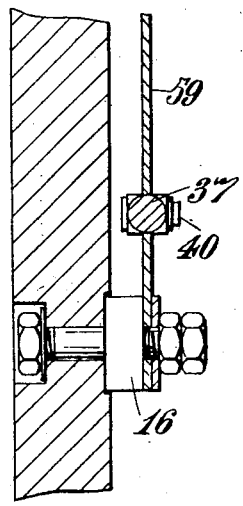
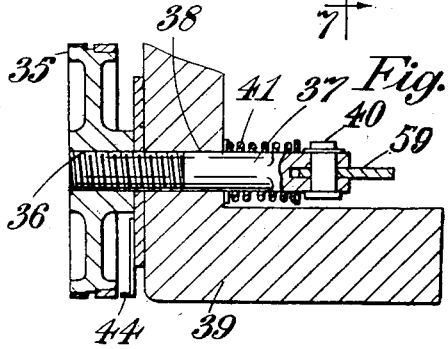

Patented Jan. 1, 1952

2,580,934

UNITED STATES PATENT OFFICE 2,580,934

APPARATUS FOR MEASURING EXTENSION OF FERROMAGNETIC MATERIAL DURING ROLLING

Angus Love and György Sik, known as George Sik, Dartford, Kent, England, assignors to Baldwin Instrument Company Limited, Dartford, Kent, England, a British company Application August 15, 1949, Serial No. 110,444 In Great Britain March 27, 1947

4 Claims. (Cl. 235—103.5)

This invention consists in improvements in or relating to an apparatus for measuring the extension of ferro-magnetic material during the process of rolling sheets or other bodies of the material.

An object of the invention is to obtain with reasonable accuracy a measurement of the extension as the rolling process is in progress so that a correction may be made from time to time in the setting of the rolling pressure in order to obtain a reasonably uniform extension of the magnitude required.

The apparatus according to the present invention comprises simultaneously applying magnetic patterns of the same frequency to the material at the ingoing and outgoing sides of the rolls, and means for comparing the forms of the magnetic patterns at the ingoing and outgoing sides so as to measure the extension of the material.

In hard material, wide in relation to its thickness, substantially all extension takes place in the direction of rolling. The percentage extension is therefore equal to $$\frac{V_2 - V_1 \times 100}{V_1}$$

where $V_1$ and $V_2$ are respectively the velocities of the material entering and leaving the rolls.

Comparison of the two velocities is obtained by the above stated method in which the forms of the magnetic patterns produced in the material before and after rolling are compared as for example by differentially comparing the detecting currents generated by the passage of the magnetised patterns through appropriate detectors.

More particularly the invention may be said to consist of means for comparing the distance traversed by a point on the material in a given time before entering the rolls with the distance traversed by a point after leaving the rolls in the same length of time, the said means comprising in combination devices for creating localised permanent magnetism in the material and means for detecting such localised magnetism spaced apart from the point where it is applied.

Magnetism of the moving ferrous material may be produced by means of an electro-magnet or input coil fed with alternating current of a suitable wave form. This may be arranged either to give opposite localised magnetic poles on opposite sides of the material or to give opposite magnetic poles both on the same side of the material. In the latter case the poles may be displaced from each other on the surface of the material in directions at right angles to the direction of movement of the sheet during rolling. But is it preferred to displace the poles in the direction of rolling. This is possible if the wave-length is about twice the magnet length.

Detection is obtained by the generation of a detecting current in a pick-up coil placed in proximity to the material so that it is cut by the lines of force of the permanent magnetism created in the material.

The coil may have a core of non-retentive magnetic material arranged to complete the magnetic circuit of the localised magnets in the material.

In practice two such systems are employed, one operating on the sheet of material before it enters the rolls and the other operating on the sheet after it has left the rolls.

The distance between one magnetising point and its corresponding detecting point is fixed and the distance between the other magnetising point and its detecting point is adjustable and is set to a difference in length representing the extension required.

In order to give an approximately constant linear pitch of the magnetic pattern on the material the frequency of the magnetic impulses is made to depend on the speed of rotation of the rolls, for example by driving the alternator supplying the magnetising units at a speed controlled by the roll speed. The magnetic impulses at the two points of application are in constant phase relationship with one another.

The pitch of the magnetic pattern is short in comparison with the distance between magnetising and detecting points and is chosen to give accuracy in obtaining correspondence, on the indicating means used, between the impulses from the two detecting points.

The impulses from the two detecting points are applied to any suitable means for indicating their phase relationship, such as being fed to opposite plates of a cathode ray oscillograph or to the two circuits on a double-beam cathode ray oscillograph. Alternatively a phase selective device using rectifying means in conjunction with an indicating instrument may be used.

In operation the distance between magnetising and detecting points on the outgoing side of the rolls is usually fixed and the distance between magnetising and detecting points on the ingoing side adjusted to give the required difference. For example if the former distance is 10″ and an extension of 0.5% is required the second distance will be set at 9.950″.

The rolling conditions will then be set so as to bring the outputs from the two detectors into the required phase relationship as indicated by the cathode ray oscillograph image or other means.

Drift from the position of coincidence will be indicated by phase displacement and such displacement may be used to control the operations of the screw-down gear on the rolling mill or other equipment affecting extension.

There will now be described by way of example and with reference to the accompanying drawings, an apparatus according to the present invention. In the drawings:

Figure 3 is a sectional elevation on the line 3—3 of Figure 4 through the rolling table at the ingoing side of the mill.

Figure 4 is a broken plan view of the table;

Figure 5 is a section on the line 5—5 of Figure 4;

Figure 6 is a plan view of an enlarged scale of a detail; and

Figures 7 and 8 are respectively sections on the lines 7—7 and 8—8 of Figure 6.

Figure 1:
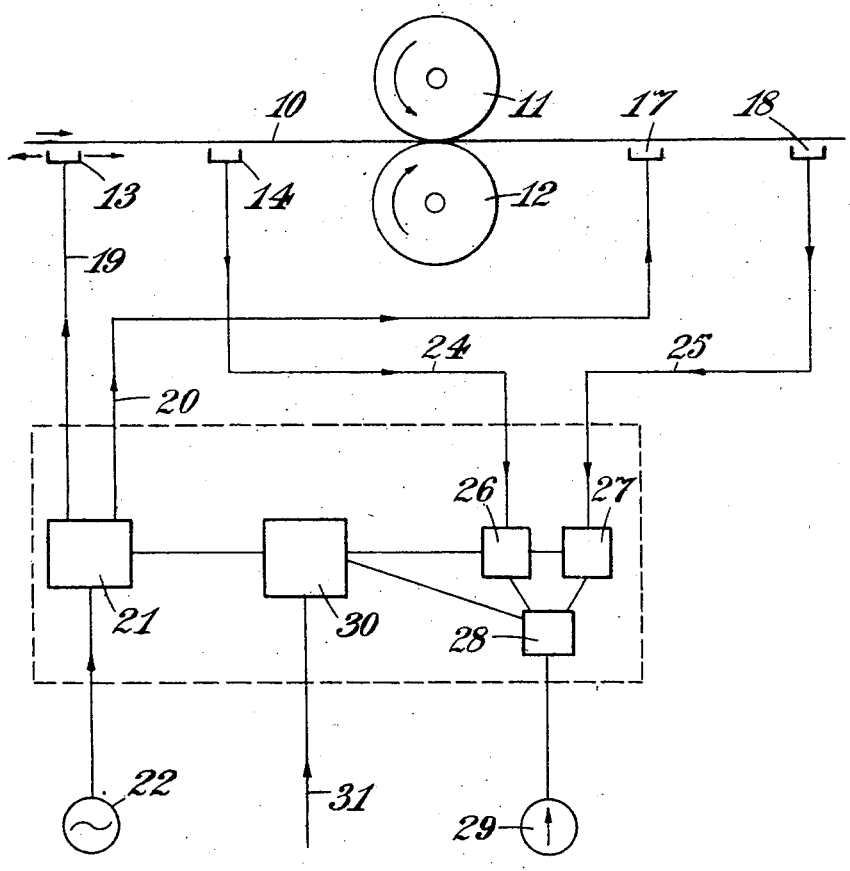
Figure 1 is a diagrammatic view of the apparatus.
Figure 2:
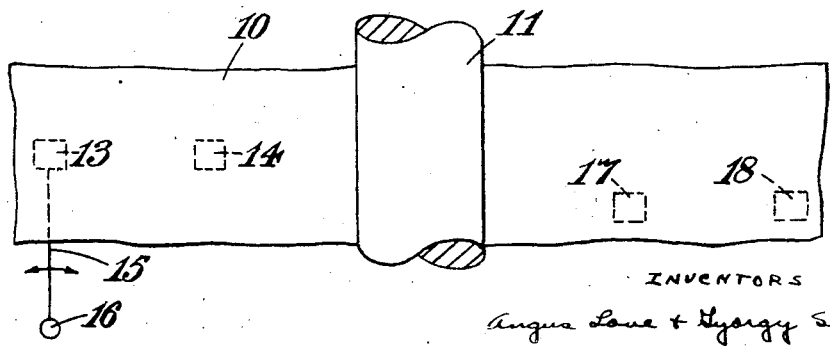
Figure 2 is a broken underside plan view of Figure 1.

Referring first to Figures 1 and 2 a strip of material 10 to be rolled in the mill is shown entering working rolls 11, 12 from left to right. Arranged under the material 10 at the ingoing side of the rolls are an input coil 13 and a pick-up coil 14. These coils are arranged in the line of travel of the material through the rolls. The pick-up coil 14 is fixed, but the input coil 13 is mounted on an arm 15 pivoted at 16 for adjusting, as shown by the arrows, the distance between the coils.

Another pair of input and pick-up coils 17, 18, is arranged under the material at the outgoing side of the rolls. These two coils are fixed, so that the spacing between them is constant. Coils 17, 18 are displaced longitudinally along the roll axis from coils 13, 14 so that the magnetic paths do not coincide.

The two input coils 13, 17 are connected by leads 19, 20 through an input amplifier 21 to an A. C. generator 22 for supplying alternating current to the coils. The generator is driven from the rolls by suitable step-up gearing (not shown) so that the frequency of the alternating current is governed by the rotational speed of the rolls.

The two pick-up coils 14, 18 are connected by leads 24, 25 to output amplifiers 26, 27 coupled through a phase discriminator 28 to a suitable indicator 29.

A power pack 30 fed from the mains 31 affords the voltage supply to the amplifiers 21, 26, 27 and the phase discriminator 28.

Referring now to the construction detailed in Figures 3–8, the adjustable input coil 13 is embedded in a body 32 of suitable moulded plastic material. The coil body 32 is mounted at one end of the lever 59 to project upwardly into an opening 33 within the horizontal rolling table 34. The top of the coil unit there lies just below the upper surface of the table. The lever 59 can be rocked in a horizontal plane by a hand drum 35 to vary the distance of the input coil unit 13 from the pick-up coil unit 14. The drum is mounted on a threaded portion 36 of a rod 37 which is slidable in a guide 38 of a fixed support 39. The other end of the rod is forked to engage over the lever 59, where it is secured by a pin 40 near the lever pivot bolt 16. A coiled compression spring 41 is mounted on the rod 37 between washers to bear against the lever 15 and support 39. The rim of the drum is graduated, and the setting is read from the graduations by a pointer 44. At its other end the lever is fitted for sliding movement between a pair of guide bars 45 secured by nuts 46 on studs 47.

The pick-up coil unit 14 is of similar construction to the input coil unit 13. It projects from a support 48 through an opening 49 in the table 34, and is embedded with its laminations 50 in a body of moulded plastic material 51.

The input and pick-up coil units 17, 18 at the outgoing side of the roll are constructed and arranged in a manner similar to the corresponding coil units 13, 14 although in this case both units are fixed.

Such a construction has been used, for example with a working roll circumference of 62.8" and the generator driven at 36 times the roll speed, giving one complete cycle per rev. or a wavelength of 1.74". The pitch distance between the fixed coils 17, 18 on the out-going side of the mill is 17", and the movable coil 13 on the in-going side of the mill can be moved to reduce this distance by about ½", giving coincidence of the two pick-up waves when the ingoing strip is moving 3% slower than the outgoing thus enabling extensions from zero to 3% to be measured.

In the operation of the apparatus, as the material 10 moves continuously through the rolls, the input coils 13 and 17 will produce regular magnetic patterns along the material, one at the ingoing side and the other at the outgoing side. The magnetic impulses at the two sides occur at the same frequency; but the magnetic pattern at the outgoing side will be attenuated owing to the increase in speed of the material subsequent to its extension by passing through the rolls. With the drum 35 adjusted for the requisite differential distance between the pairs of coils 13, 14 and 17, 18 corresponding to the required extension of material, the rolling conditions are then adjusted to bring the outputs from the two pick-up coils 14 and 18, into phase to give a null reading on the indicator 29. Drift from the rolling conditions affording the requisite extension will be shown by phase displacement on the indicator.

We claim:

1. Apparatus for measuring the extension of moving ferro-magnetic material passed between working rolls during a rolling process, comprising a magnetic marking device for applying a magnetic sine-wave pattern at a controlled frequency to one face only of the moving material at the ingoing side of the working rolls, a pick-up device for detecting the magnetic sine-wave pattern at the ingoing side of the working rolls, a second magnetic marking device for applying a second magnetic sine-wave pattern to the material but at the outgoing side of the working rolls, said second magnetic sine-wave pattern being applied at a frequency identical to the frequency of the first magnetic sine-wave pattern, a second pick-up device for detecting the second magnetic sine-wave pattern applied to the material, an alternating current generator for simultaneously supplying alternating current to the first and the second magnetic marking devices, and indicator means controlled by the two pick-up devices for comparing the phase relationship of the two magnetic sine-wave patterns.

2. Apparatus as claimed in claim 1, wherein the distance between one marking device and its corresponding pick-up device is fixed and the distance between the other marking device and its pick-up device is adjustable to a difference in length representing the extension required.

3. An apparatus as claimed in claim 1, wherein the frequency of the alternating current supplied by the alternating current generator is made to depend on the speed of rotation of the rolls.

4. An apparatus as claimed in claim 1, wherein the pitch of the magnetic pattern is short in comparison with the distance between magnetising and detecting points.

ANGUS LOVE.
GYÖRGY SIK,
*Known as George Sik.*

REFERENCES CITED

The following references are of record in the file of this patent:

UNITED STATES PATENTS

| Number | Name | Date |
|---|---|---|
| 2,259,904 | McNamee et al. | Oct. 21, 1941 |
| 2,332,573 | Hibschman et al. | Oct. 26, 1943 |
| 2,332,797 | Hume | Oct. 26, 1943 |
| 2,466,251 | Martin | Apr. 5, 1949 |
| 2,485,285 | Harris | Oct. 18, 1949 |